(12) United States Patent
Koerner et al.

(10) Patent No.: US 11,245,270 B2
(45) Date of Patent: Feb. 8, 2022

(54) TWO-VOLTAGE BATTERY

(71) Applicant: Hella GmbH & Co. KGaA, Lippstadt (DE)

(72) Inventors: Andre Koerner, Lippstadt (DE); Hans Joachim Liebscher, Wuerzburg (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 149 days.

(21) Appl. No.: 16/578,694

(22) Filed: Sep. 23, 2019

(65) Prior Publication Data
US 2020/0021120 A1 Jan. 16, 2020

Related U.S. Application Data

(63) Continuation of application No. PCT/EP2018/056802, filed on Mar. 19, 2018.

(30) Foreign Application Priority Data

Mar. 21, 2017 (DE) .................. 10 2017 106 017.0

(51) Int. Cl.
*H02J 7/00* (2006.01)
*B60R 16/033* (2006.01)
(Continued)

(52) U.S. Cl.
CPC ............ *H02J 7/0024* (2013.01); *B60L 58/19* (2019.02); *B60R 16/033* (2013.01); *H02J 1/082* (2020.01);
(Continued)

(58) Field of Classification Search
CPC ....... H02J 7/0024; H02J 1/082; B60R 16/033; B60Y 2300/91; Y02T 10/70; B60L 58/19
(Continued)

(56) References Cited

U.S. PATENT DOCUMENTS

2005/0212495 A1  9/2005  Leyten et al.
2006/0092583 A1  5/2006  Alahmad et al.
(Continued)

FOREIGN PATENT DOCUMENTS

DE  10055531 A1  1/2002
DE  102012010711 A1  3/2013
(Continued)

OTHER PUBLICATIONS

International Search Report dated Jun. 15, 2018 in corresponding application PCT/EP2018/056802.

*Primary Examiner* — Zixuan Zhou
(74) *Attorney, Agent, or Firm* — Muncy, Geissler, Olds & Lowe, P.C.

(57) ABSTRACT

A two-voltage battery for a vehicle, having at least one ground terminal, a first vehicle electrical system connection at which a low, first vehicle electrical system voltage is provided, and a second vehicle electrical system connection at which a high, second vehicle electrical system voltage is provided. At least one battery submodule having at least two battery cell blocks and a multiplicity of switching elements is provided for connecting the battery cell blocks in parallel and/or in series as desired. In a first connection arrangement, the same are connected in parallel with one another such that the first vehicle electrical system voltage is provided at the first vehicle electrical system connection. The switching elements in a second connection arrangement connect the battery cell blocks in series with one another such that the second vehicle electrical system voltage is provided at the second vehicle electrical system connection.

15 Claims, 8 Drawing Sheets

(51) Int. Cl.
*H02J 1/08* (2006.01)
*B60L 58/19* (2019.01)
*H02M 3/157* (2006.01)

(52) U.S. Cl.
CPC .......... *B60Y 2300/91* (2013.01); *H02M 3/157* (2013.01); *Y02T 10/70* (2013.01)

(58) Field of Classification Search
USPC .......................................... 320/116–117, 126
See application file for complete search history.

(56) References Cited

U.S. PATENT DOCUMENTS

| | | | |
|---|---|---|---|
| 2008/0211451 A1* | 9/2008 | Zhang | .................. H02J 7/35 320/101 |
| 2011/0001442 A1* | 1/2011 | Lee | .................. B62M 6/60 318/139 |
| 2014/0225443 A1 | 8/2014 | Nomoto | |
| 2016/0211680 A1* | 7/2016 | Ganor | .................. H02J 7/00 |
| 2018/0254658 A1 | 9/2018 | Koerner et al. | |
| 2019/0207192 A1 | 7/2019 | Koerner et al. | |

FOREIGN PATENT DOCUMENTS

| | | |
|---|---|---|
| DE | 102013113182 A1 | 5/2015 |
| DE | 102014201358 A1 | 7/2015 |
| DE | 102016008052 A1 | 2/2017 |
| WO | WO2017001142 A1 | 1/2017 |
| WO | WO2018046442 A1 | 3/2018 |

* cited by examiner

TWO-VOLTAGE BATTERY

This nonprovisional application is a continuation of International Application No. PCT/EP2018/056802, which was filed on Mar. 19, 2018, and which claims priority to German Patent Application No. 10 2017 106 017.0, which was filed in Germany on Mar. 21, 2017, and which are both herein incorporated by reference.

BACKGROUND OF THE INVENTION

Field of the Invention

The present invention relates to a two-voltage battery for a vehicle, having a ground terminal, having a first vehicle electrical system connection at which a low, first vehicle electrical system voltage is provided, and having a second vehicle electrical system connection at which a high, second vehicle electrical system voltage is provided. The two-voltage battery includes a plurality of battery cell blocks that can be connected in parallel and/or in series as desired through switching elements in order to provide the first vehicle electrical system voltage and/or the second vehicle electrical system voltage.

Description of the Background Art

A two-voltage battery of the aforementioned type is known from DE 10 2013 113 182 A1. The known two-voltage battery is constructed such that, in a two-voltage vehicle electrical system, a first group of electrical loads can be operated at the first vehicle electrical system voltage and a second group of electrical loads can be operated at the second, higher vehicle electrical system voltage by means of the battery. For example, the two-voltage battery serves to supply power for a 12 V vehicle electrical system and for a 48 V vehicle electrical system. The two voltages can be made available by the two-voltage battery, in particular simultaneously, through the vehicle electrical system connections.

SUMMARY OF THE INVENTION

It is therefore an object of the present invention to improve a service life of the battery by equalizing the flow of current through the different battery cell blocks of the two-voltage battery.

In an exemplary embodiment, provision is made in this regard that the battery cell blocks of the at least one battery submodule are connected in parallel with one another in a first connection arrangement so that the first vehicle electrical system voltage is provided at the first vehicle electrical system connection. The first vehicle electrical system voltage corresponds in this respect to the voltage of the battery cell blocks. In a second connection arrangement, the battery cell blocks are connected in series with one another in such a manner that the second vehicle electrical system voltage is provided at the second vehicle electrical system connection. At the same time, it is the case that the voltage difference across all battery cell blocks of the battery submodule in the second connection arrangement corresponds to a difference between the second vehicle electrical system voltage and the first vehicle electrical system voltage.

An advantage of the invention includes that no battery cell block of the two-voltage battery according to the invention is permanently associated with a vehicle electrical system voltage and, in particular, not with the first vehicle electrical system voltage. Thus no distinction is made between switching and non-switching battery cell blocks. According to the invention, this measure achieves the aim that a balanced flow of current is ensured through all battery cell blocks and all battery cells of the various battery cell blocks with the result that the service life of the two-voltage battery is optimized. At the same time, the need to carry out an energy transfer between strongly charged and weakly charged locations is eliminated. In this respect, the construction of the individual battery cells is simplified, and a large number of battery cells and/or battery submodules can be realized identically and economically.

The charging of the battery cells or of the battery cell blocks is accomplished by, for example, a generator that is conventionally operated, for example by the recovery of braking energy, and that is associated with the two-voltage battery.

In the second connection arrangement a negative pole of a first battery cell block of the battery submodule can be connected to the first vehicle electrical system connection and a positive pole of a last battery cell block of the battery submodule can be connected to the second vehicle electrical system connection. Optionally, additional battery cell blocks of the battery submodule can be connected in series between the first battery cell block and the last battery cell block. The negative pole of the first battery cell block is then at the voltage level of the first vehicle electrical system connection, and the second vehicle electrical system connection has a voltage level that is higher by the sum of the individual voltages of the battery cell blocks.

Two battery submodules can be provided, having at least two battery cell blocks apiece and the switching elements associated with each of the battery cell blocks. The two battery cell blocks are provided in parallel with one another relative to the first vehicle electrical system connection and relative to the second vehicle electrical system connection. It is advantageously ensured by the provision of the two battery submodules that one battery submodule is always available to provide the low, first vehicle electrical system voltage. This takes into account the fact that, at least at the present time, the low, first vehicle electrical system voltage is used for safety-critical loads and accordingly must always be provided. It is possible in this regard to omit an additional energy source or a supporting energy storage device for supporting or powering a vehicle electrical system operated at the first vehicle electrical system voltage. The overall construction of the power supply of the vehicle is reduced as a result.

For example, when two battery submodules are provided, a first battery submodule can be provided in the first connection arrangement. The battery cell blocks of the first battery submodule, which then are connected in parallel, provide the first vehicle electrical system voltage to the first vehicle electrical system connection. In addition, the second vehicle electrical system voltage can be provided to the second vehicle electrical system connection by a second battery submodule whose battery cell blocks are connected in series in the second connection arrangement.

If a generator associated with the two-voltage battery is only connected to or operated at one of the two vehicle electrical systems, an unequal loading of the vehicle electrical systems resulting herefrom can be balanced by the means that the two battery submodules are regularly switched between the first connection arrangement and the second connection arrangement. For example, one battery submodule can be charged at the high, second vehicle electrical system voltage while the other battery submodule provides the low, first vehicle electrical system voltage and powers the first vehicle electrical system. Subsequently, the configuration of the battery submodules switches such that the battery submodule that was just charged now provides the low, first vehicle electrical system voltage and powers the first vehicle electrical system, and the battery submodule that previously provided the low, first vehicle electrical system voltage is thenceforth charged by the generator.

Three or more battery submodules can be provided that are connected in parallel with one another relative to the first vehicle electrical system connection and relative to the second vehicle electrical system connection. With the provision of three battery submodules, the switching of the configuration of the battery submodules is advantageously simplified such that even during the switchover itself, it is always the case that at least one battery submodule can provide the first vehicle electrical system voltage and a second battery submodule can provide the second vehicle electrical system voltage. An interruption, which in any case is temporary, in the provision of the low, first vehicle electrical system voltage and the higher, second vehicle electrical system voltage is avoided in this way.

Also, all battery submodules can be identical in design. In this respect, they have the same number of switching elements and the same number of battery cell blocks or battery cells. Furthermore, the configuration of the switching elements and battery cell blocks or battery cells of all battery submodules can be identical. The construction of the two-voltage battery is advantageously simplified, and the battery submodules of identical design can be manufactured economically in large quantities.

A DC-to-DC converter can be provided between the first terminal and the second terminal of the two-voltage battery in order to support the vehicle electrical systems.

The two-voltage battery according to the invention provides an additional vehicle electrical system connection. With respect to the additional vehicle electrical system connection, the at least two battery cell blocks of the at least one battery submodule can be transferred into a parallel connection and/or into a series connection through the switching elements and through additional switching elements. All battery submodules of the two-voltage battery are arranged here to be connected in parallel with one another relative to the additional vehicle electrical system connection. Due to the provision of the additional vehicle electrical system connection, a decoupling can advantageously be achieved between the first vehicle electrical system operated at the low vehicle electrical system voltage and the second vehicle electrical system operated at the high vehicle electrical system voltage. In particular for the case when the second vehicle electrical system is subjected to high loading due to the loads operated there, and in particular is exposed to cyclic loading over time, the loads of the first vehicle electrical system can be powered independently and reliably when the vehicle electrical systems are separated.

The first vehicle electrical system voltage can be provided at the additional vehicle electrical system connection. The additional vehicle electrical system connection can be available only internally to the battery. Provision is not made in this regard that a tap for the additional vehicle electrical system connection is routed to the outside through the housing of the two-voltage battery. The additional vehicle electrical system connection can advantageously provide a base voltage level for the second, high vehicle electrical system voltage. In this regard, it takes on the electrotechnical function of the first vehicle electrical system connection, albeit only internally to the battery. Nevertheless, the first vehicle electrical system connection can be implemented and decoupled separately from the additional vehicle electrical system connection and/or from the second vehicle electrical system connection.

A detector unit can also be provided. By means of the detector unit, a charging current and/or a discharging current and/or an impressed voltage and/or a voltage change are detected at the second vehicle electrical system connection. Further, a central control unit can be provided in addition that is designed for operating the switching elements and/or the additional switching elements and is in operative connection therewith in this regard. The switching elements in this design are operated as a function of an input control signal fed to the central control unit. An output signal of the detector unit serves as the input control signal for the central control unit, for example. Advantageously, a load-dependent operation of the switching elements, and thus a reliable powering of the loads in the first vehicle electrical system and in the second vehicle electrical system, can be achieved through the provision of the detector unit and its interaction with the central control unit. In particular, in the case of high charging or discharging currents or in the case of sudden voltage changes, the vehicle electrical systems can be separated by a circuit or an especially heavily loaded vehicle electrical system can be supported through the switching of battery cell blocks.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
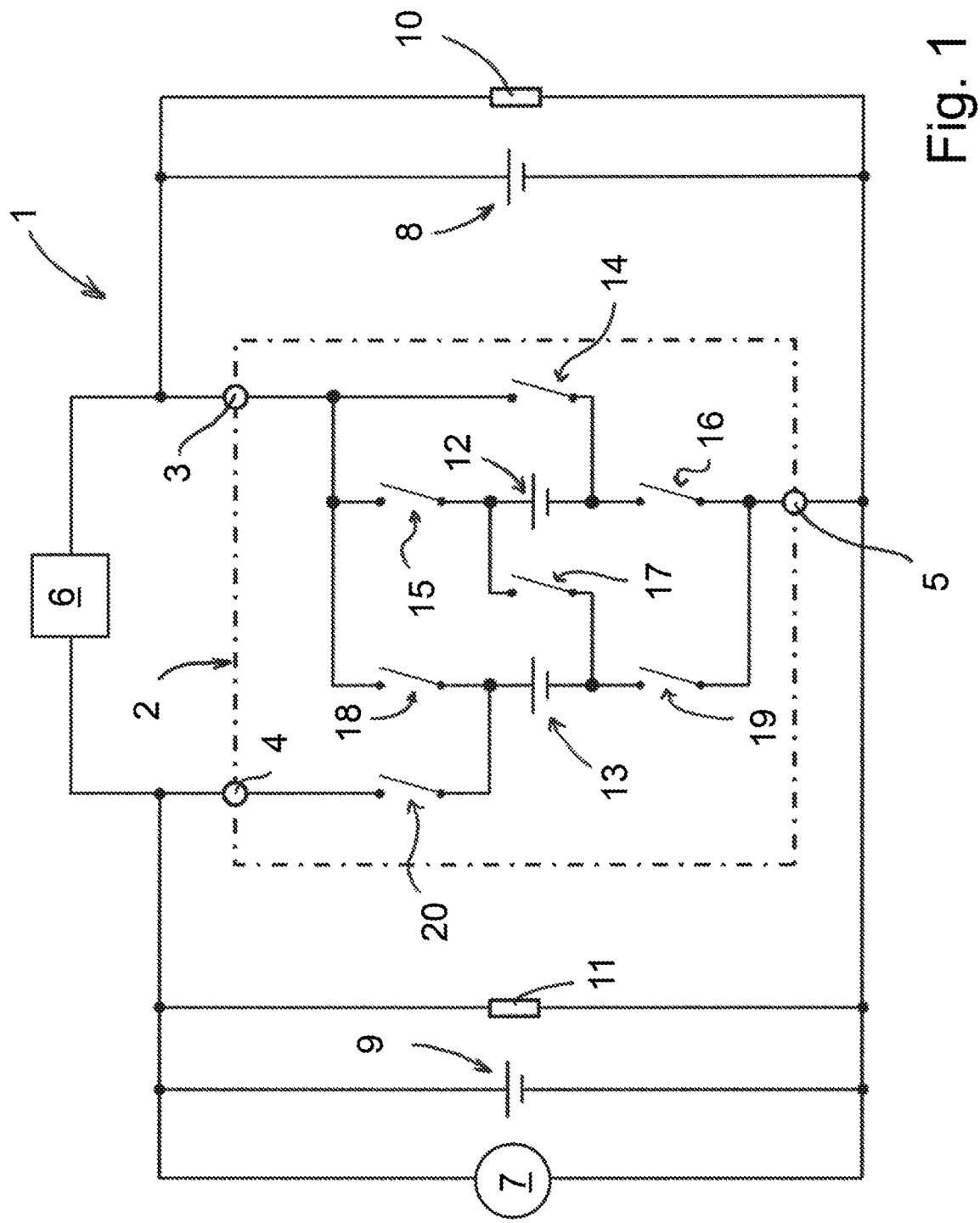
FIG. 1 shows a two-voltage battery according to the invention with one battery submodule.

A two-voltage battery 1 according to FIG. 1 includes as functional components a first battery submodule 2 with a first vehicle electrical system connection 3, with a second vehicle electrical system connection 4, and with a ground terminal 5, a DC-to-DC converter 6 provided between the vehicle electrical system connections 3, 4, a generator 7 associated with the second vehicle electrical system connection 4 by way of example, and a first supporting energy storage device 8 and a second supporting energy storage device 9. The first supporting energy storage device 8 is associated with a first load 10, shown by way of example, which is connected to the first vehicle electrical system connection 3 and is operated at a low, first vehicle electrical system voltage. The second supporting energy storage device 9 is associated with a second load 11, which is connected to the second vehicle electrical system connection 4 and is operated at a second, high vehicle electrical system voltage.

The battery submodule 2 of the two-voltage battery 1 includes two battery cell blocks 12, 13. A multiplicity of switching elements 14, 15, 16, 17, 18, 19, 20 is associated with the two battery cell blocks 12, 13, which are constructed of a multiplicity of battery cells that are not depicted individually and that are preferably identical in design. The switching elements 14, 15, 16, 17, 18, 19, 20 are designed and arranged for connecting the battery cell blocks 12, 13 in parallel and in series as desired.

In a first connection arrangement, the battery cell blocks 12, 13 of the battery submodule 2 are connected in parallel in such a manner that the first vehicle electrical system voltage is provided at the first vehicle electrical system connection 3. In the first connection arrangement, accordingly, the switching elements 15, 16, 18, 19 are closed and the switching elements 14, 17, 20 are open.

In a second connection arrangement, the battery cell blocks 12, 13 of the battery submodule 2 are connected in series. In the second connection arrangement, the second vehicle electrical system voltage is provided at the second vehicle electrical system connection 4. In the second connection arrangement, for series connection of the battery cell blocks 12, 13, the switching elements 14, 17, 20 are closed, and the switching elements 15, 16, 18, 19 are open.

Figure 2:
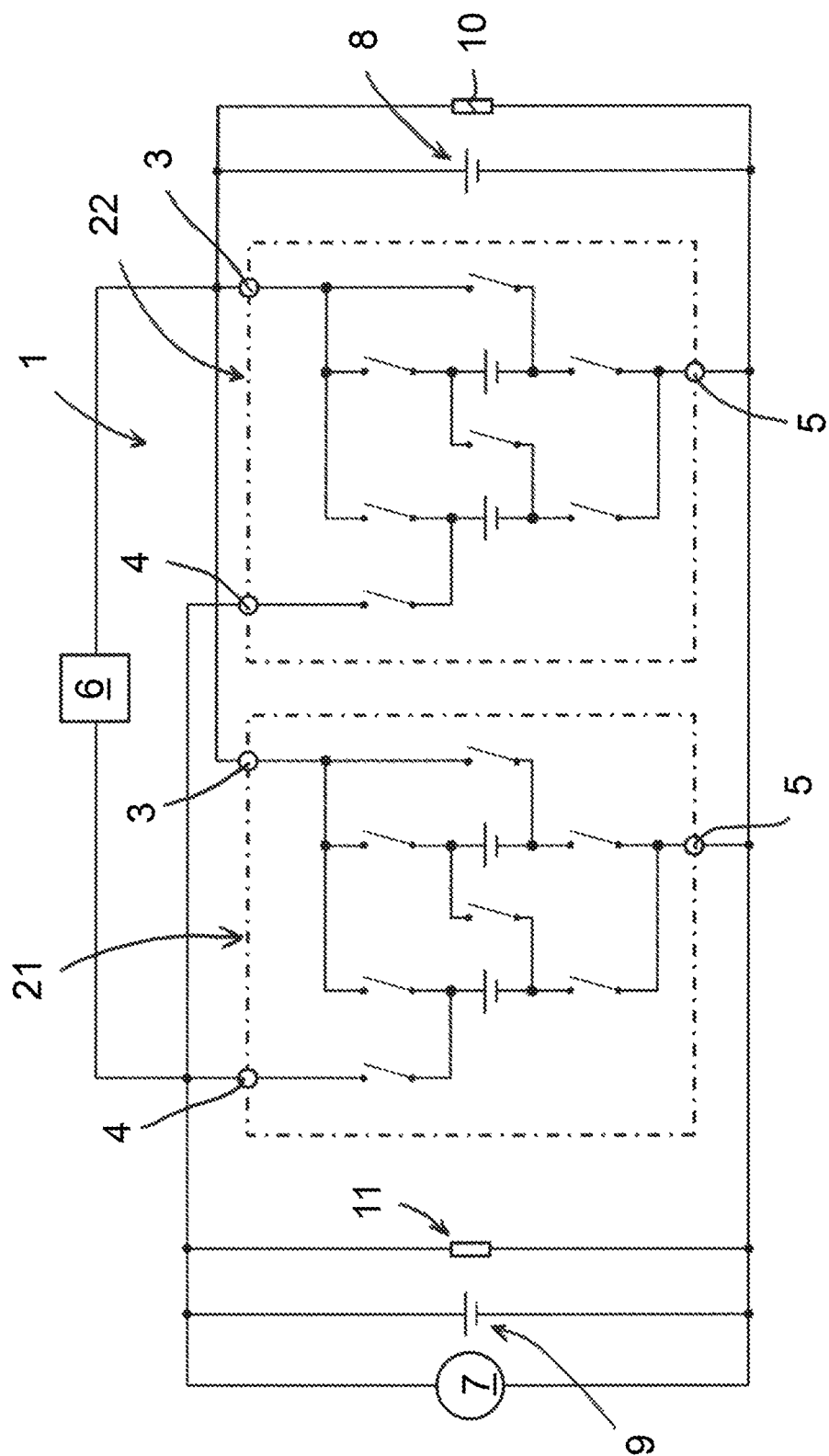
FIG. 2 shows the two-voltage battery according to the invention with two battery submodules in a first configuration.

According to the invention per FIG. 2, the two-voltage battery 1 now includes two identical battery submodules 21, 22. The internal construction of the battery submodules 21, 22 corresponds to the construction of the battery submodule 2 from FIG. 1. Therefore, a detailed repetition of the construction is omitted.

Due to the provision of the two identical battery submodules 21, 22, the first vehicle electrical system voltage and the second vehicle electrical system voltage can be provided simultaneously at the two-voltage battery 1. In addition, the connection arrangements of the battery submodules 21, 22 can be switched. In this case, the first supporting energy storage device 8 and/or the second supporting energy storage device 9 temporarily takes on powering of the loads 10, 11 in the first vehicle electrical system or in the second vehicle electrical system.

If, for example, the first battery submodule 21 originally provided the high, second vehicle electrical system voltage at the second vehicle electrical system connection 4 and the second battery submodule 22 provided the low, first vehicle electrical system voltage at the first vehicle electrical system connection 3, the first battery submodule 21 can be transferred from the second connection arrangement into the first connection arrangement. The first vehicle electrical system voltage is then provided at the first vehicle electrical system connection 3, at least in the short term, by the first battery submodule 21 and by the second battery submodule 22. The electrical load 11, which is operated at the second vehicle electrical system voltage, is then temporarily operated through the second supporting energy storage device 9. Furthermore, the second battery submodule 22 is subsequently transferred from the first connection arrangement into the second connection arrangement so that the second vehicle electrical system voltage for the second load 11 is provided thenceforth by the second battery submodule 22.

Figure 3:
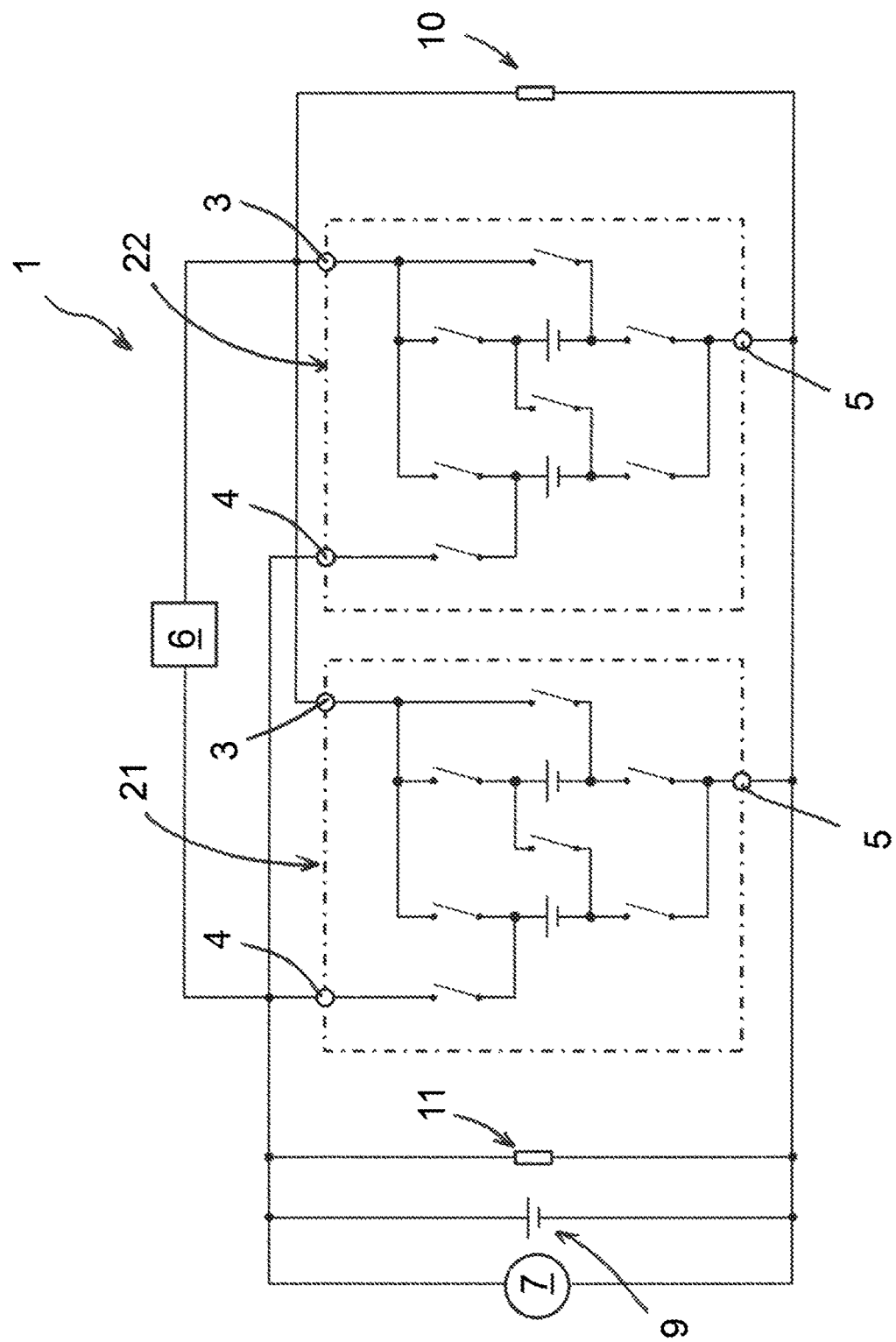
FIG. 3 shows the two-voltage battery according to the invention with two battery submodules in a second configuration.

The above remarks make it clear that when two battery submodules 21, 22 are provided, the first load 10 at the first vehicle electrical system voltage, by way of example, can be supplied with power on a sustained basis by the two-voltage battery 1. The first supporting energy storage device 8, which is associated with the first vehicle electrical system or with the load 10 in the first vehicle electrical system, is nonessential in this regard. A correspondingly adapted and simplified configuration of the two-voltage battery 1 is shown by way of example in FIG. 3. In FIG. 3, the two-voltage battery 1 is provided with two identical battery submodules 21, 22, and in comparison to the configuration from FIG. 2 omits solely the supporting energy storage device 8 for the first vehicle electrical system and otherwise corresponds to the first configuration of the two-voltage battery 1 with two battery submodules 21, 22 according to FIG. 2.

Figure 4:
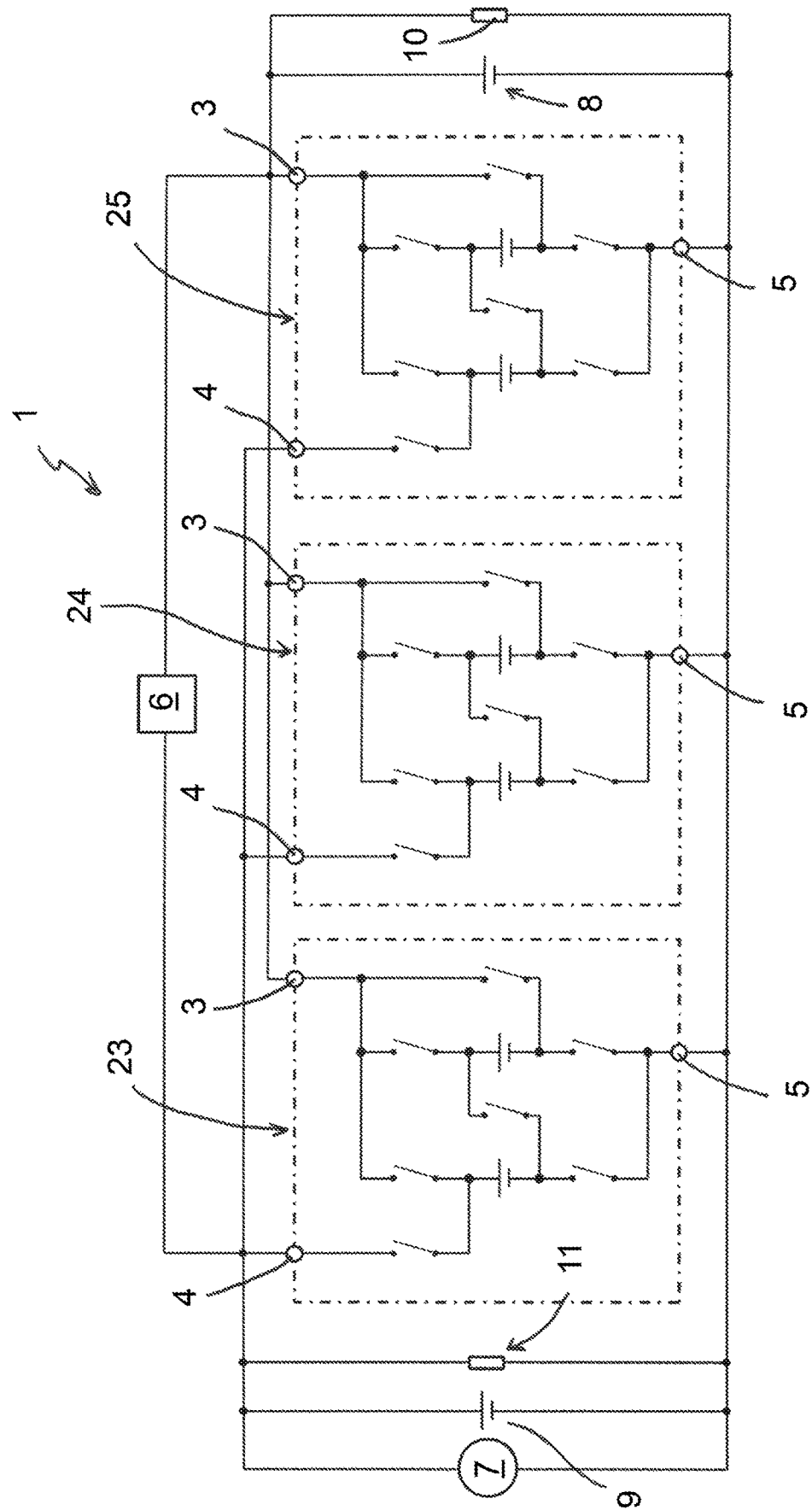
FIG. 4 shows the two-voltage battery according to the invention with three battery submodules in a first configuration.

The two-voltage battery 1 with three identical battery submodules 23, 24, 25 according to FIG. 4 is redundant in design such that in every case at least one battery submodule 23, 24, 25 provides the first vehicle electrical system voltage at the first vehicle electrical system connection 3 or at least one battery submodule 23, 24, 25 provides the second vehicle electrical system voltage at the second vehicle electrical system connection 4 on a sustained basis and also, in particular, in the event of a changing or switching of the connection arrangement for the battery submodules 23, 24, 25.

Figure 5:
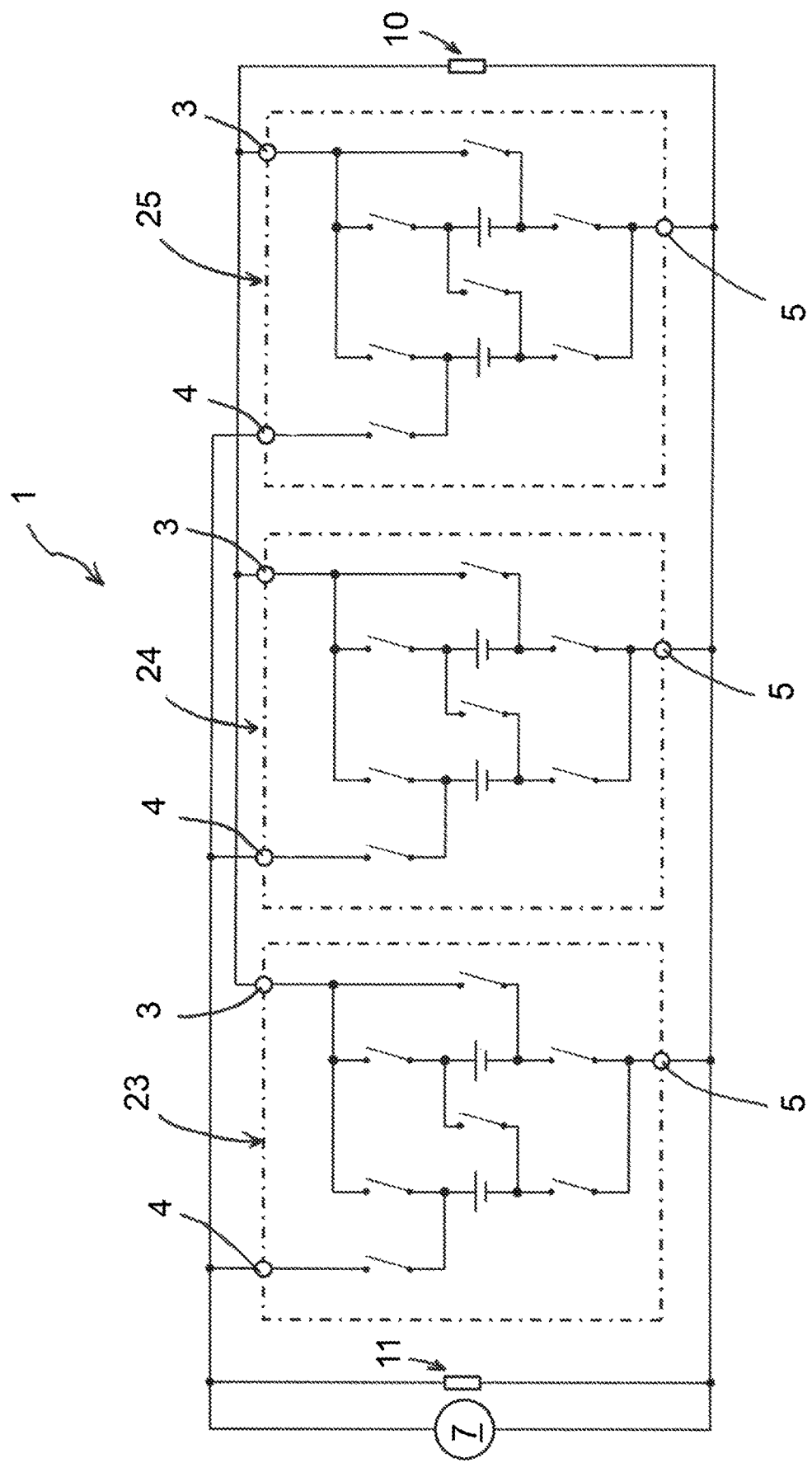
FIG. 5 shows the two-voltage battery according to the invention with three battery submodules in a second configuration.

Since at least one battery submodule 23, 24, 25 is available for each vehicle electrical system voltage at every point in time, consequently the supporting energy storage devices 8, 9 for the first electrical load 10 operated at the first vehicle electrical system voltage and the second electrical load 11 operated at the second vehicle electrical system voltage can be omitted. An appropriately adapted configuration is shown in FIG. 5.

Figure 6:
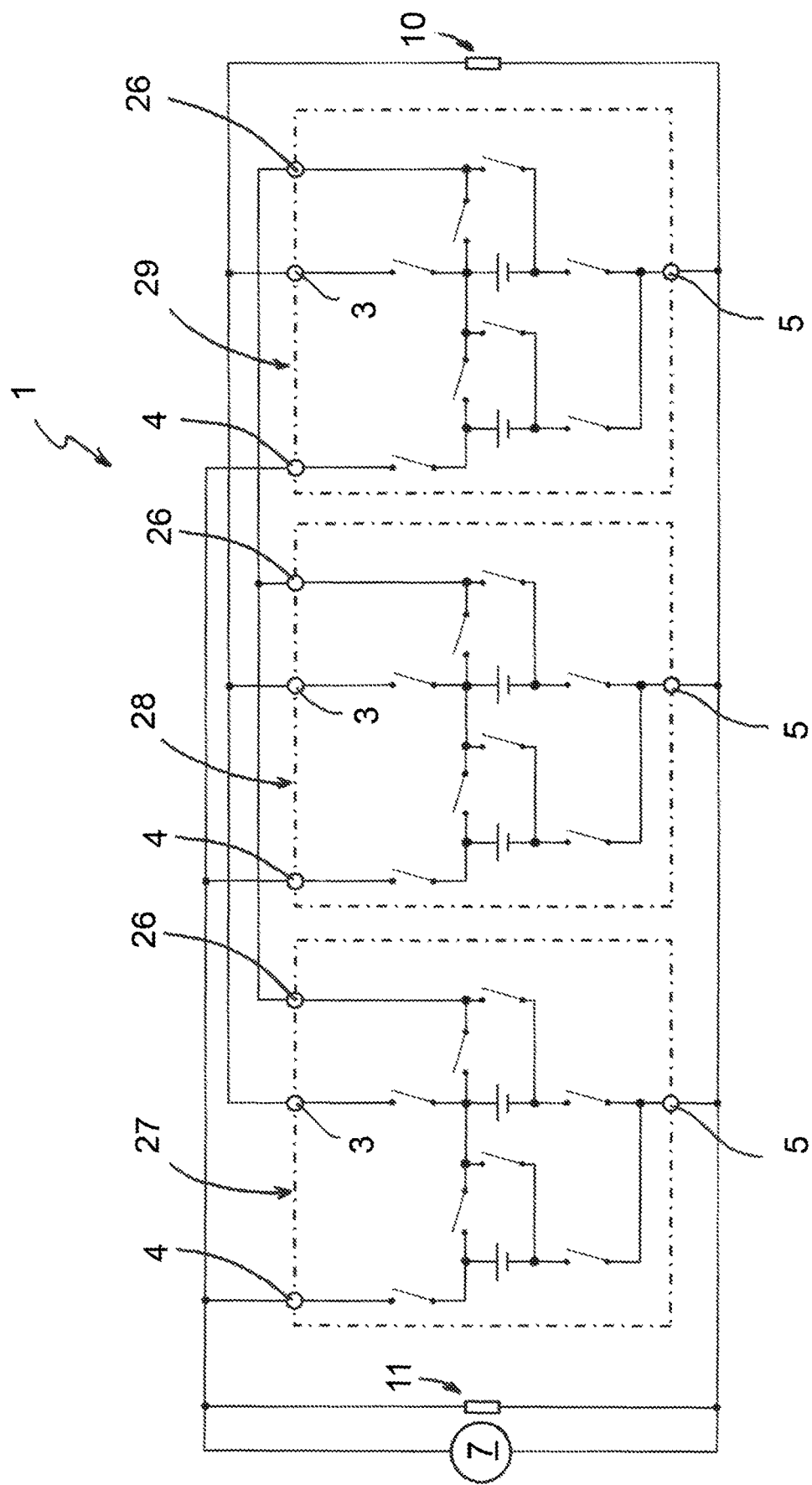
FIG. 6 shows the two-voltage battery according to the invention with three battery submodules in a third configuration.
Figure 7:
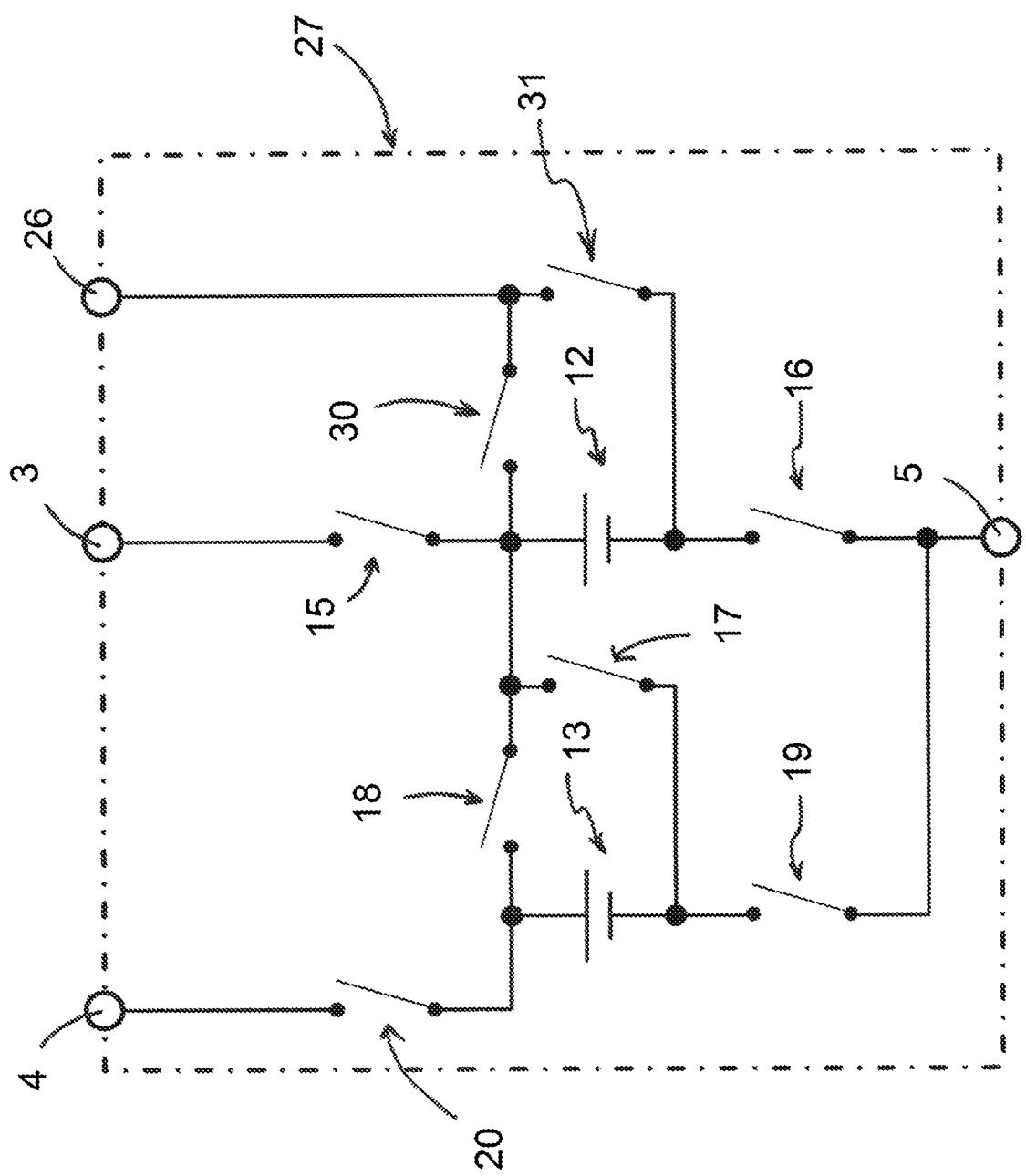
FIG. 7 shows a detail view of a battery submodule of the two-voltage battery from FIG. 6.

According to the invention shown in FIGS. 6 and 7, provision is made that an additional vehicle electrical system connection 26 is implemented internally to the battery and that the three battery submodules 27, 28, 29 of the two-voltage battery 1 according to the invention provide the low, first vehicle electrical system voltage at the additional vehicle electrical system connection 26 in the same way as at the first vehicle electrical system connection 3. The high, second vehicle electrical system voltage is provided unchanged at the second vehicle electrical system connection 4.

The battery submodules 27, 28, 29 can provide the low, first vehicle electrical system voltage at the first vehicle electrical system connection 3 in that the switching elements 15, 16, 18, 19 are closed and all other switching elements 17, 20 as well as additionally provided switching elements 30, 31 are open. The low, first vehicle electrical system voltage can, moreover, be provided simultaneously at the first vehicle electrical system connection 3 and at the additional vehicle electrical system connection 26 in that the additional switching element 30 is also closed. In analogous fashion, the low, first vehicle electrical system voltage can be provided only at the additional vehicle electrical system connection 26 in that the additional switching element 30 is closed and the switching element 15 is open. Provision of the high, second vehicle electrical system voltage preferably is accomplished in that the battery cell blocks 12, 13 are connected in series starting from the additional vehicle electrical system connection 26. To this end, the additional switching element 31 and the switching elements 17 and 20 are closed while all other switching elements as well as the additional switching element 30 are open.

As a result of the provision of the additional vehicle electrical system connection 26 in the case of a two-voltage battery, a first battery submodule 27, for example, can provide the low, first vehicle electrical system voltage at the first vehicle electrical system connection 3 to power the electrical load 10 in the first vehicle electrical system. A second battery submodule 28 can provide the low, first vehicle electrical system voltage at the additional vehicle electrical system connection 26. With reference to the additional vehicle electrical system connection 26, the third battery submodule 29 can then provide the high, second vehicle electrical system voltage to power the electrical load 11 in the second vehicle electrical system. The first vehicle electrical system and the second vehicle electrical system are separated from one another in this design so that, for example, high charging or discharging currents in the second vehicle electrical system or voltage changes in the second vehicle electrical system cause no disturbances in the first vehicle electrical system. The electrical load 10 in the first vehicle electrical system is reliably supplied with electric power in this respect.

Figure 8:
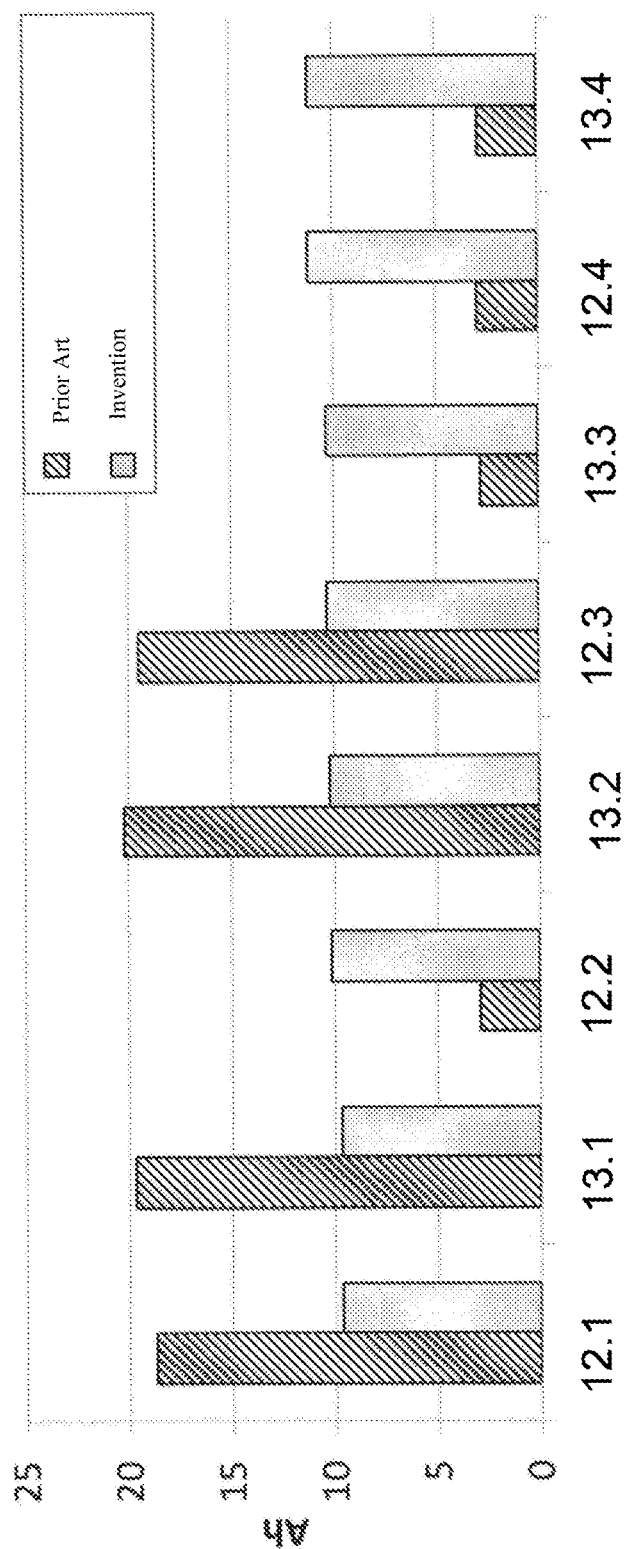
FIG. 8 is a comparison of the currents through the individual battery cell blocks of a two-voltage battery according to the invention and of a two-voltage battery according to the prior art.

FIG. 8 shows a comparison of a two-voltage battery according to the invention and a two-voltage battery known from the prior art. It is assumed here that the two-voltage battery according to the invention has four battery submodules with two battery cell blocks 12.1, 12.2, 12.3, 12.4, 13.1, 13.2, 13.3, 13.4 apiece, which in the form shown provide the first vehicle electrical system voltage at the first vehicle electrical system connection 3 and/or provide the second vehicle electrical system voltage at the second vehicle electrical system connection 4. An additional vehicle electrical system connection 26 can optionally be provided. In contrast, the referenced two-voltage battery according to the prior art provides two battery cell blocks 12.4, 13.4, which permanently serve to power the first vehicle electrical system at the first vehicle electrical system voltage. In addition, two battery submodules with three battery cells apiece are provided, which can be connected in parallel to provide the first vehicle electrical system voltage and/or provide the second vehicle electrical system voltage in a series connection.

The comparison shows clearly that, in the two-voltage battery according to the invention, the battery currents are essentially equal over all battery cell blocks, and all battery cell blocks accordingly have an equal loading and/or a very similar service life. In contrast, in the two-voltage battery known from the prior art, some battery cell blocks are very heavily loaded, whereas other battery cell blocks have a very low battery current. The service life of the two-voltage battery known from the prior art is therefore shorter than the service life of the two-voltage battery according to the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A two-voltage battery for a vehicle, comprising:
   at least one ground terminal;
   a first vehicle electrical system connection at which a low, first vehicle electrical system voltage is provided;
   a second vehicle electrical system connection at which a high, second vehicle electrical system voltage is provided;
   a DC-to-DC converter provided between the first vehicle electrical system connection and the second vehicle electrical system connection;
   at least one battery submodule having at least two battery cell blocks; and
   at least two switching elements to connect the battery cell blocks in parallel and/or in series,
   wherein, in a first connection arrangement of the battery cell blocks, the battery cell blocks are connected in parallel with one another such that the first vehicle electrical system voltage is provided at the first vehicle electrical system connection,
   wherein the switching elements in a second connection arrangement of the battery cell blocks connect the battery cell blocks in series with one another such that the second vehicle electrical system voltage is provided at the second vehicle electrical system connection,
   wherein a voltage difference across all battery cell blocks of the battery submodule in the second connection arrangement corresponds to a difference between the second vehicle electrical system voltage and the first vehicle electrical system voltage, and
   wherein the DC-to-DC converter provides the low, first vehicle electrical system voltage, when the battery cell blocks are in the second connection arrangement.

2. The two-voltage battery according to claim 1, wherein, in the second connection arrangement, a negative pole of a first battery cell block of the at least one battery submodule is connected to the first vehicle electrical system connection and a positive pole of a last battery cell block of the at least one battery submodule is connected to the second vehicle electrical system connection.

3. The two-voltage battery according to claim 1, further comprising two battery submodules arranged in parallel with one another relative to the first vehicle electrical system connection and to the second vehicle electrical system connection.

4. The two-voltage battery according to claim 1, further comprising three or more battery submodules connected in parallel with one another relative to the first vehicle electrical system connection and relative to the second vehicle electrical system connection.

5. The two-voltage battery according to claim 1, wherein the at least one battery module is at least two battery submodules modules, and wherein each of the at least two battery submodules are substantially identical.

6. The two-voltage battery according to claim 3, further comprising an additional vehicle electrical system connection, wherein the battery cell blocks of the at least one battery submodule are adapted to be transferred with respect to the additional vehicle electrical system connection into a parallel connection as a third connection arrangement and/or into a series connection as a fourth connection arrangement via the switching elements and via additional switching elements, and wherein the battery submodules are arranged to be in parallel with one another relative to the additional vehicle electrical system connection.

7. The two-voltage battery according to claim 6, wherein the additional vehicle electrical system connection is only internal to the battery.

8. The two-voltage battery according to claim 1, wherein a detector unit is provided for detection of a charging and/or discharging current and/or an impressed voltage and/or a voltage change at the second vehicle electrical system connection.

9. The two-voltage battery according to claim 6, further comprising a central control unit that interacts with the switching elements and/or with additional switching elements and that operates the switching elements and/or the additional switching elements as a function of an input control signal in order to transfer the battery cell blocks into the first connection arrangement and/or into the second connection arrangement and/or into the third connection arrangement and/or into the fourth connection arrangement.

10. The two-voltage battery according to claim 6, wherein a detector unit is provided for detection of a charging or discharging current or an impressed voltage or a voltage change at the second vehicle electrical system connection, and
wherein the input control signal is provided for the central control unit by the detector unit.

11. The two-voltage battery according to claim 6, wherein the first vehicle electrical system voltage is provided at the additional vehicle electrical system connection.

12. The two-voltage battery according to claim 1, wherein the low, first vehicle electrical system voltage and the high, second vehicle electrical system voltage are adapted to be provided simultaneously.

13. A two-voltage battery for a vehicle, comprising:
at least one ground terminal;
a first vehicle electrical system connection at which a low, first vehicle electrical system voltage is provided;
a second vehicle electrical system connection at which a high, second vehicle electrical system voltage is provided;
at least two battery submodules each having at least two battery cell blocks; and
at least two switching elements to connect the battery cell blocks in parallel and in series,
wherein, in a first connection arrangement of the battery cell blocks, the battery cell blocks are connected in parallel with one another such that the first vehicle electrical system voltage is provided at the first vehicle electrical system connection,
wherein the switching elements, in a second connection arrangement of the battery cell blocks, connect the battery cell blocks in series with one another such that the second vehicle electrical system voltage is provided at the second vehicle electrical system connection,
wherein a voltage difference across all battery cell blocks of one of the at least two battery submodules in the second connection arrangement corresponds to a difference between the second vehicle electrical system voltage and the first vehicle electrical system voltage, and
wherein, in the second connection arrangement, the battery cell blocks of at least one of the at least two battery submodules remain in parallel to provide the first vehicle electrical system voltage to the first vehicle electrical system connection of the vehicle.

14. The two-voltage battery according to claim 13, wherein, during a switchover from the first connection arrangement to the second connection arrangement, at least one battery submodule of the at least two battery submodules provides the first vehicle electrical system voltage and at least one second battery submodule of the at least two battery submodules provides the second vehicle electrical system voltage.

15. The two-voltage battery according to claim 13, wherein the low, first vehicle electrical system voltage and the high, second vehicle electrical system voltage are adapted to be provided simultaneously.

* * * * *